Nov. 28, 1967 W. J. CHENEY ET AL 3,355,076

TAPE DRIVING APPARATUS

Filed May 5, 1965 4 Sheets-Sheet 1

WALTER J. CHENEY &
FRITZ A. FRICK
INVENTORS

BY Robert G. Clay

ATTORNEY

WALTER J. CHENEY &
FRITZ A. FRICK
INVENTORS

BY Robert G. Clay

ATTORNEY

WALTER J. CHENEY
FRITZ A. FRICK
INVENTORS

BY Robert S. Clay

ATTORNEY

WALTER J. CHENEY dec'd
FRITZ A. FRICK
INVENTORS

BY Robert G. Clay

ATTORNEY 3,355,076
TAPE DRIVING APPARATUS

Walter J. Cheney, San Mateo, and Fritz A. Frick, Redwood City, Calif., assignors to Ampex Corporation, Redwood City, Calif., a corporation of California Filed May 5, 1965, Ser. No. 453,350
15 Claims. (Cl. 226—11)

This invention relates to tape driving apparatus, and particularly to such apparatus adapted for automatic disengagement and retraction.

Previously in the art, tape driving means such as capstans have been arranged for pressurized engagement with the tape throughout the operating mode of the transport on which the tape is carried. The tape is usually tensioned across a transducing head by a pair of supply and takeup reels, respectively held back and driven by a pair of motors, or by a brake and motor. If the brake or reel motors fail, the capstan continues driving the tape, with the result that the tape may become wrapped around the capstan, jamming it, and damaging the tape and transducing head. The same malfunction may take place if the tape breaks, or if the end of the tape comes off the reel.

Additionally, when the transducing heads are mounted in fixed positions in close proximity to the capstan, as for reducing the undesirable effects of vibration in the tape, access to the heads for cleaning and demagnetizing is difficult.

Accordingly, it is an object of this invention to provide apparatus for automatically disabling the tape driving means when the tape tension falls below a predetermined value, as upon tape breakage, arrival of the end of tape, or failure of the reel control means.

It is a further object of this invention to provide apparatus for making the transducing heads readily available for cleaning and demagnetizing.

It is still a further object of this invention to provide a retractable capstan in combination with means for automatically disabling the capstan when the tape tension falls below a predetermined value.

In accordance with the invention, there is provided a capstan, on one side of which a transducing head is mounted in close proximity, and on the other side of which is mounted a pair of differential-pressure tape storage and tensioning columns. The capstan is retractable in an axial direction to clear the transducing head without engaging the differential-pressure columns. The capstan is also arranged to engage the tape by differential pressure or suction means, and the vacuum supply for the capstan is identical with the vacuum supply for the differential-pressure columns. The vacuum channel or conduit supplying the capstan communicates directly with the low-pressure side of the tape loop in the differential-pressure columns. Consequently, if the vacuum fails, or if either of the tape loops grow too long, or if the tape breaks or the end of tape arrives, then the vacuum supply to the capstan is automatically cut off, and the capstan, though still turning, ceases to drive the tape.

A better understanding of the invention may be had by reference to the following description, taken in conjunction with the accompanying drawings, in which.

Figure 1:
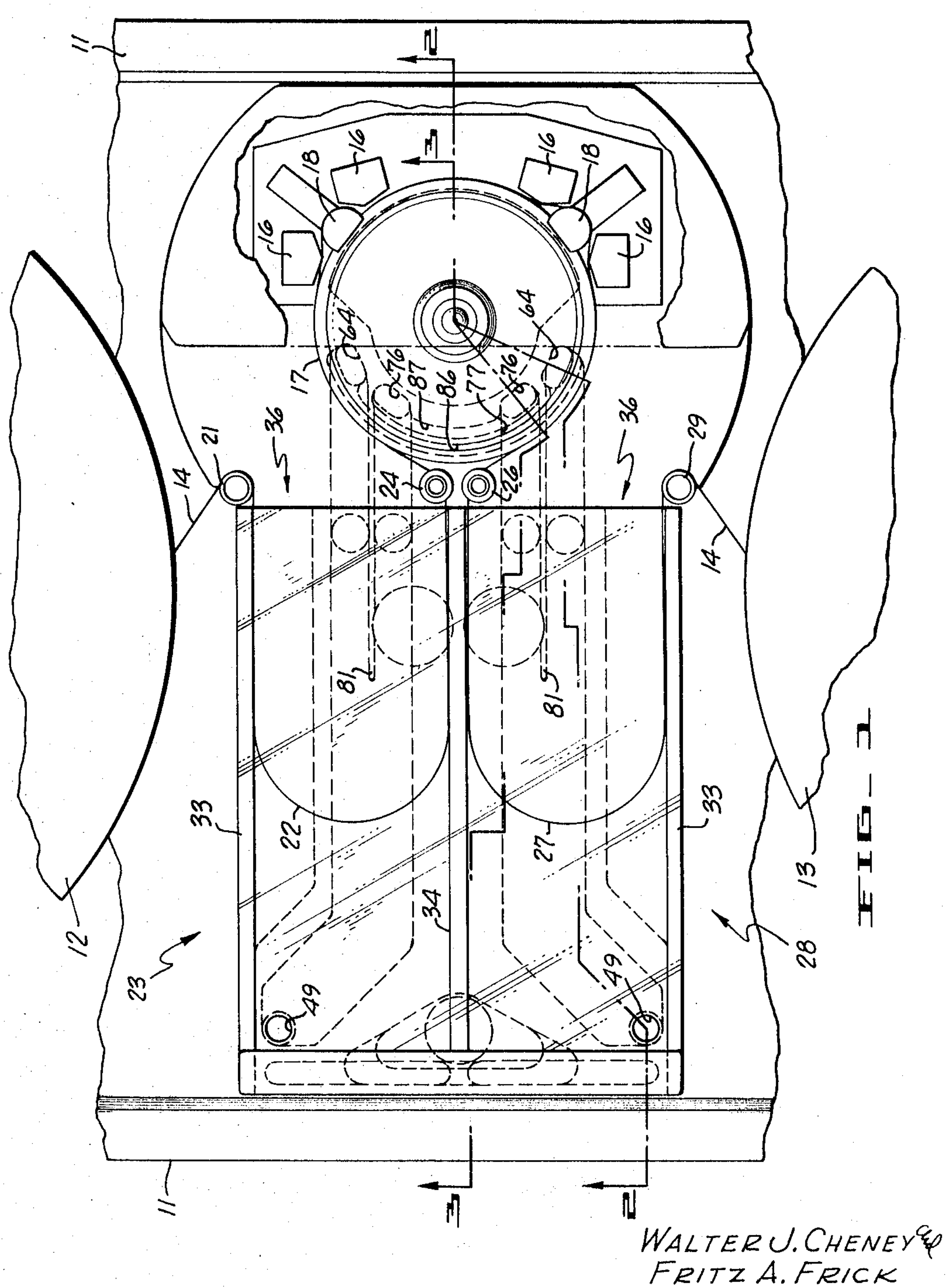
FIGURE 1 is a fragmentary elevation of the apparatus of the invention.

Referring now to the drawing and particularly to FIGURE 1, there is shown a portion 11 of the "top plate" or front panel of a magnetic tape transport, constituting a framework on which is mounted a supply reel 12 and a takeup reel 13 for starting and tensioning a magnetic tape 14 as it is moved past a number of magnetic transducing heads 16 by a capstan 17. The takeup reel 13 is provided, in a manner customary in the art, with a motor (not shown), and the supply reel 12 is provided, also in a customary manner, with a motor or brake for holding back the supply reel and tensioning the tape. The heads 16 are mounted as disclosed in copending U.S. patent application S.N. 309,218 for "Tape Handling Device" by Walter J. Cheney, et al., filed September 16, 1963, now United States Patent No. 3,227,343 and assigned to the same assignee. Briefly, this mounting arrangement provides for the tape 14 to be held slightly away from the capstan 17 in two spaced sectors thereof by means of a pair of guide posts 18, with the heads 16 engaging the extremely short unsupported lengths of tape between the capstan and guide posts 18, and in very close proximity to the capstan, so as to reduce the undesirable effects of high frequency vibration of the tape.

Coming from the supply reel 12, the tape passes over a guide post 21 and then is formed into a loop 22 in an air pressure differential column 23. The tape passes thence out of the column and around a guide post 24, around the capstan 17, engaging the heads 16 and guide posts 18, thence around a guide post 26. The tape is then formed into a second loop 27 in a second air pressure differential column 28. From the column 28, the tape passes over a guide post 29 and thence to the takeup reel 13.

Figures 3, 5, 6:
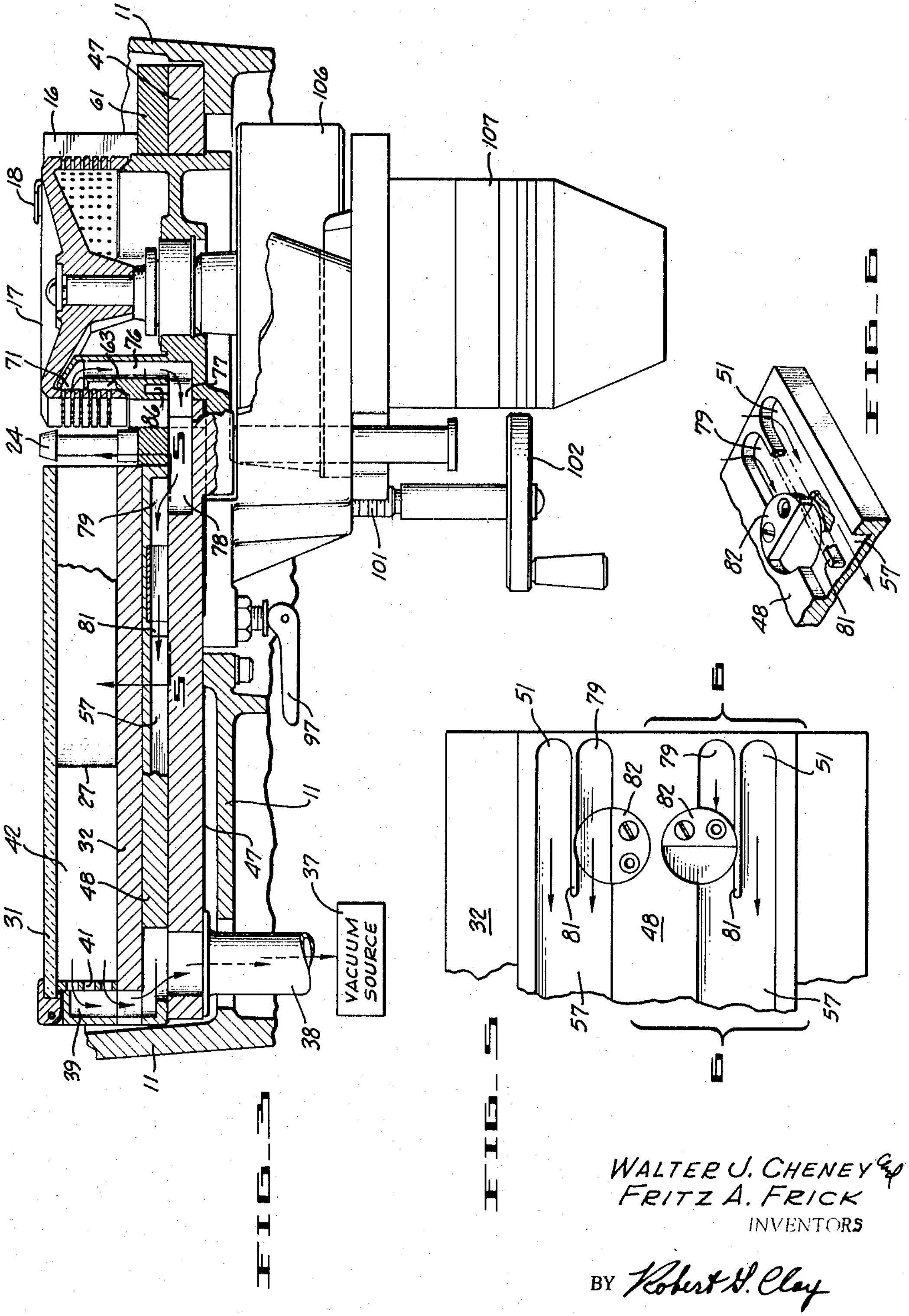
FIGURE 3 is a cross-section taken on the plane of lines 3—3 of FIGURE 1.
FIGURE 5 is a fragmented view taken on the plane of lines 5—5 of FIGURE 3.
FIGURE 6 is a perspective view of a portion of the apparatus indicated by bracket 6—6 of FIGURE 5.

Both of the columns 23, 28 are formed as shown in FIGURES 1 and 3, with a pair of opposed side walls 31 and 32, the edges of the tape in the loops respectively confronting these side walls; a pair of perpendicular walls 33 and 34, the wall 34 being common to both walls; an open end 36, into which the tape loops are drawn; and a vacuum source means 37 coupled to the other end of each column as by means of a conduit 38 communicating with a plenum chamber 39 that extends across the end of the column and communicates with the interior of the column by means of appropriate openings 41.

Figures 2, 4:
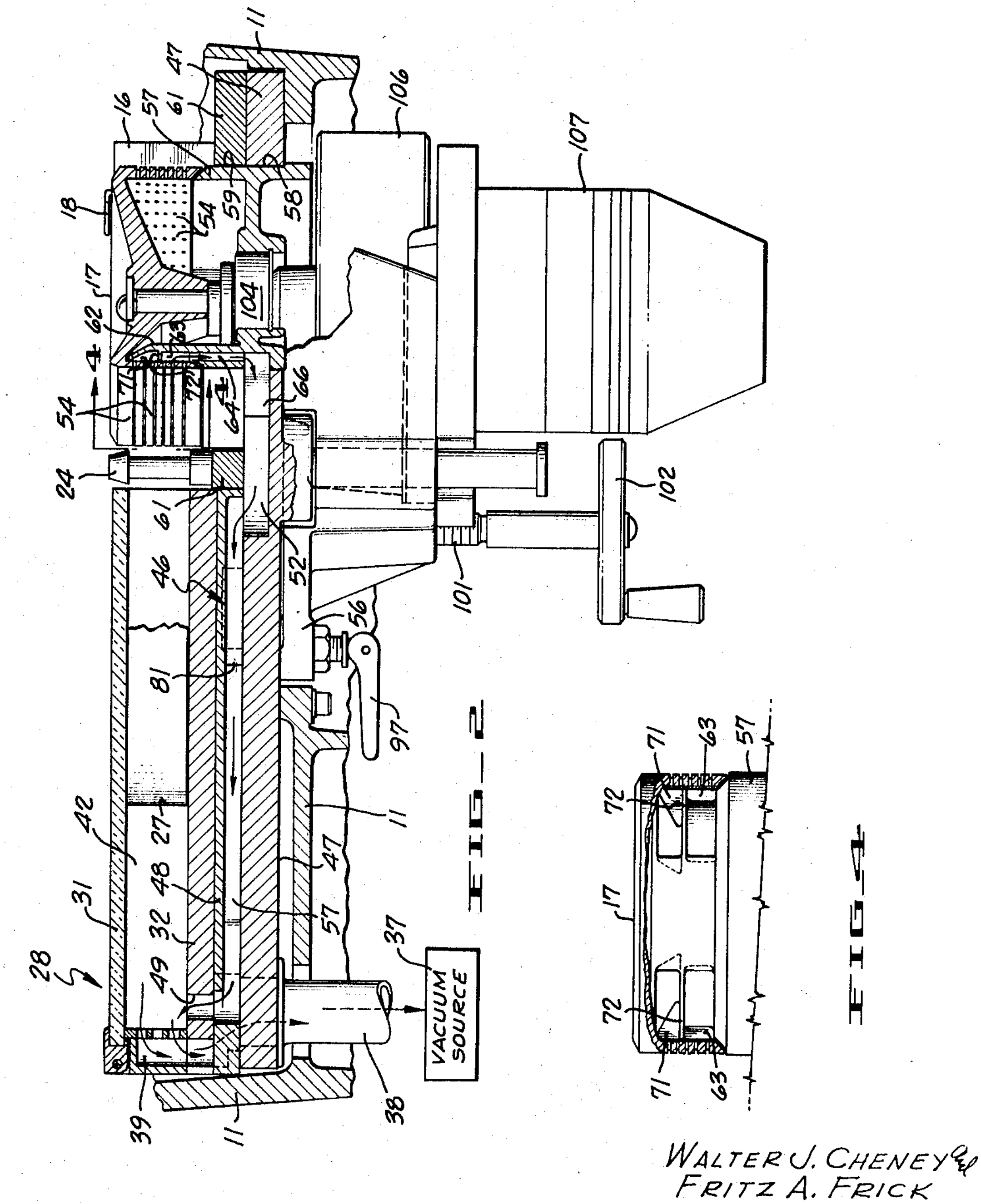
FIGURE 2 is a cross-section taken on the plane of lines 2—2 of FIGURE 1.
FIGURE 4 is a fragmented view taken on the plane of lines 4—4 of FIGURE 2.

As shown in FIGURES 1 and 2, the capstan 17 is arranged to drivingly engage the tape as by means of suction or vacuum communicated to the inside of the capstan directly from the low pressure side 42 of the tape loop in each of the columns 23, 28. Thus, so long as the pressure differential exists and the machine is functioning properly, the tape will be driven by the capstan; but the capstan will be automatically uncoupled from the tape when certain malfunctions take place, so as to avoid wrapping the tape around the capstan and jamming or damaging it and the heads 16. Particularly as shown in FIGURE 2, the columns 23, 28 are mounted on a base plate assembly 46 comprising a lower base plate 47 mounted directly on the frame or top plate 11 of the transport, and a superimposed upper base plate 48 mounted on the lower plate 47 and carrying the wall 32 of the tape loop column. The wall 32 of the column has an opening 49 formed in a corner thereof close to the plenum chamber 39 and communicating with a channel 51 formed in the upper plate 48. The channel 51 runs toward the capstan 17 to a point near the end of the plate 48, where the channel 51 overlaps and communicates with the end of a facing channel 52 that continues in the direction of the capstan 17. The capstan itself is formed as a hollow cylindrical member, the interior of which communicates with the tape driving surface thereof by means of appropriate openings 54. The capstan is mounted for rotation on a mounting plate 56. The plate 56 has a boss portion 57 coaxial with and of slightly larger diameter than the capstan, and extending through conforming circular openings 58 and 59 in the lower base plate 47 and a head mounting and channel 52 covering plate 61, respectively. To carry the suction from the channel 52 to the interior of the capstan, the boss portion 57 has a manifold portion 62 extending into the hollow interior of the capstan and conforming to the inner surface thereof. The manifold portion 62 has a manifold cavity 63 communicating with the openings 54 of the capstan and, by means of a bore 64 and a second channel 66 in the boss portion, with the first channel 52 of the lower base plate 47. Thus, so long as the tape loop is of normal length as shown in the drawing, the capstan 17 will drivingly engage the tape by means of the suction communicated from the vacuum source 37, the low pressure side 42 of the tape loop column and the openings and channels 49, 51, 52, 66, 64, 63 and 54. The arrows in the figures illustrate the direction of flow of leakage air, which is very slight. However if the tape breaks in either column, or elsewhere, or if the end of the tape comes off one of the reels, or if the vacuum source 37 fails, or if the tape loop is pulled out of the tape loop column or bottoms against the closed end at plenum chamber 39, then in all such cases, at least one of the openings 49 will be exposed to atmospheric pressure, or the high pressure side of the tape loop. Then air at atmospheric pressure enters the opening 49 and is communicated to the capstan so as to disable the capstan and prevent it from further driving the tape.

It is to be noted that the openings 49 are shown as located near the plenum chamber ends of the tape loop columns. However, the openings 49 could be located at any point in the side wall 32 and much closer to the open end 36 of the column, if it were desired to cause uncoupling of the tape and capstan at a different point on the excursion path of the tape loop.

A feature of the invention is its adaptability for use with tapes of different widths, without destroying the vacuum as by exposing some of the holes 54 to the ambient atmosphere. As shown in FIGURES 2 and 3, the manifold cavity 63 is actually a subcavity separated from another subcavity 71 as by means of a partition 72 that is normal to the axis of the capstan, so that each of the subcavities 63, 71 communicates exclusively with a different peripheral band of the holes 54. If it is desired to use a narrow tape, only the subcavity 63 is used, and the columns 23, 28 are replaced by similar columns having a smaller spacing between the side walls 31, 32, conforming to the narrow tape width. If it is desired to use tape of the width shown in the drawing, both of the cavities 63, 71 are used. The cavity 71 communicates separately with the tape loop column as shown in FIGURE 3, i.e., through a bore 76 and channel 77 in the boss portion 57, and a mating channel 78 in the lower base plate 47. The channel 78 in turn overlaps with and communicates with a channel 79 in the upper base plate 48, which channel 79 joins the channel 51 at the end of a partition 81. The channel 79 may be blocked off, when it is desired to use a narrow tape, by means of of a valve gate 82, which may be rotated when the apparatus is disassembled. As shown in FIGURES 5 and 6, the valve gate 82 is formed as a flat cylindrical plug with a portion of one diametrical half cut away, so that when the gate 82 is rotated as shown in the lower part of FIGURE 5 and in FIGURE 6, the flow of air in channel 79 is cut off, but when the gate 82 is rotated 90° as shown in the upper part of FIGURE 5, the channel 79 is open for the passage of air or the communication of vacuum. Channel 51 is always open.

It is to be noted that other means may be employed for closing the conduit to subcavity 71, such as valves or plugs of any design, positioned at any point in the conduit.

Further details of the cavities 63, 71 are shown in FIGURE 4. Actually, there are two pairs of the channels 63, 71, one pair conforming to the predetermined sector (FIGURE 1) in which the tape engages the capstan between the guide post 24 and first head 16, coming onto the capstan, and the other pair conforming to the sector between the last head 16 and the guide post 26, in which the tape engages the capstan just before going off the capstan. Thus it is ensured that the vacuum behind the tape will be preserved. For balancing the pressures in the two sets of cavities 63, 71, the two cavities 63 communicate directly with each other by means of a channel 86 (FIGURE 3 and FIGURE 1) formed in the boss portion 57; and the two channels 71 also communicate through a similar channel 87 shown in FIGURE 1.

Figure 7:
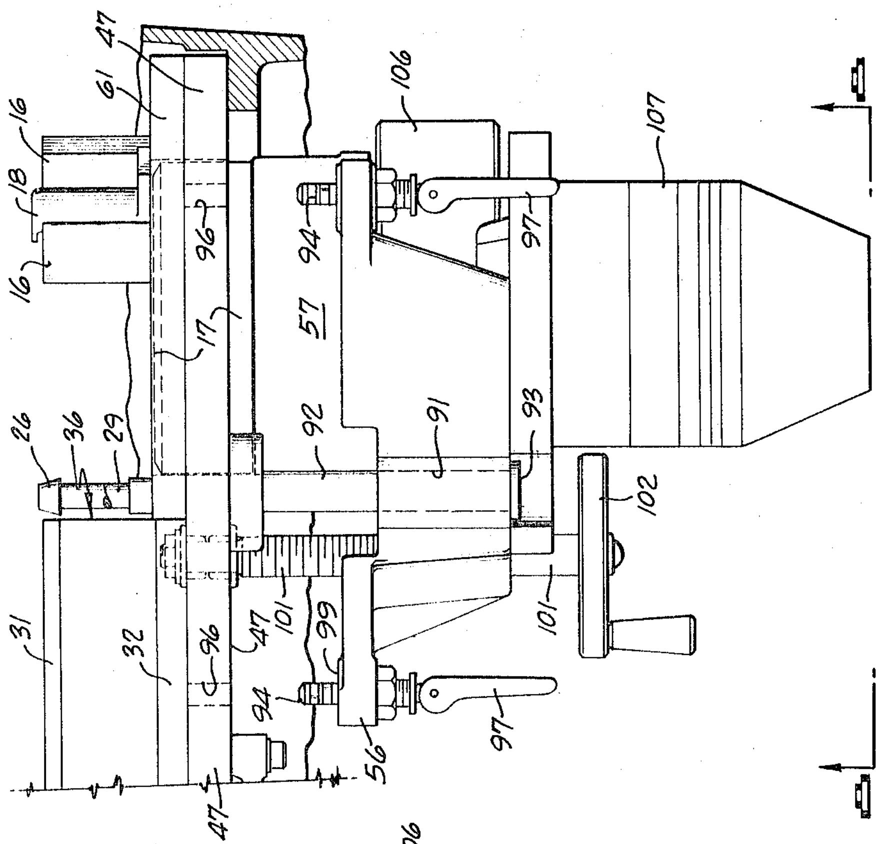
FIGURE 7 is an elevation similar to that of FIGURES 2 and 3, showing a retracted position of the apparatus.
Figure 8:
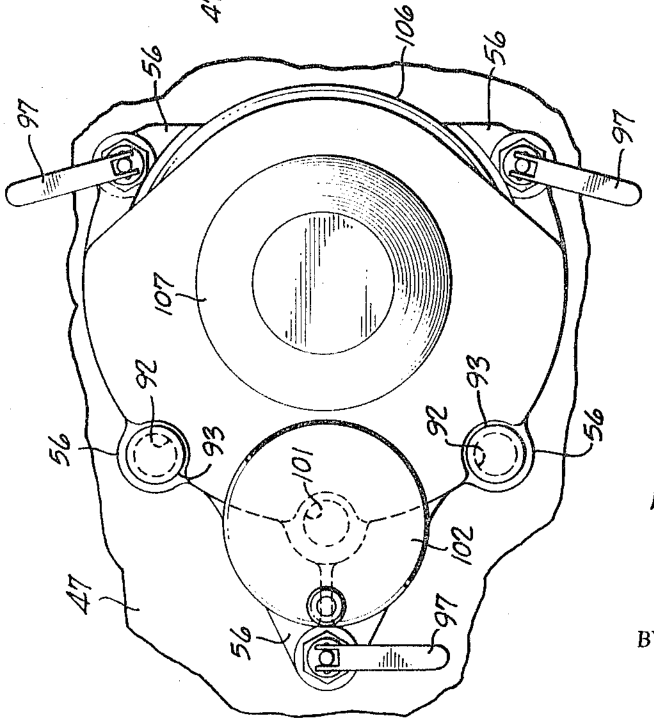
FIGURE 8 is a back elevation taken along the plane of lines 8—8 of FIGURE 7.

To provide access to the heads 16 for cleaning and demagnetizing, the capstan 17 is arranged to be retractable in an axial direction as illustrated in FIGURES 7 and 8. The mounting plate 56 is provided with a pair of journals 91 for sliding movement on a pair of guide rods 92 that extend from the base plate 47 parallel to the axis of the capstan. The rods 92 have enlarged end portions 93 for limiting the retracting movement of the capstan. The boss portion 57 of the plate 56 fits snugly but slidably within the opening 58 of the base plate 47, and the boss portion 59 cooperates with the guide rods 93 to guide the capstan back to the precise axial position it must occupy in the upper or extended position (FIGURE 2). Axial alignment and positioning of the capstan in a direction parallel to the axis thereof is accomplished by means of three triangularly spaced expandable clamping pins 94 extending from the mounting plate 56 into gauge holes 96 in the base plate 47. The pins 94 are operated by toggle levers 97, which in the extended position as shown in FIGURE 7, permit the pins 94 to slidably penetrate the gauge holes 96. However when the mounting plate 56 engages the base plate 47, the toggle levers 97 may be rotated to the position shown in FIGURE 8, causing peripheral expansion of the pins 94, causing a tendency for longitudinal movement of the pins 94 toward the retracting direction with respect to the plate 56 so as to snugly draw the plate 56 to the plate 47 and clampingly engage the two plates. The plate 56 is provided with three raised gauged surfaces 99 for engaging the plate 47 and for precise axial alignment and positioning of the capstan in an axial direction with respect to the plate 47. Movement of the plate 56 toward and away from the plate 47 is accomplished by means of a screw element 101 mounted on the plate 47 and engaging a threaded bore in the plate 56; and the screw element 101 is provided with a hand wheel 102. As shown in FIGURE 2, the capstan is mounted on the mounting plate 56 as by means of a shaft 103 and bearings 104. A flywheel 106 and motor 107 are also mounted directly on the mounting plate 56 for driving and controlling the capstan, and for bodily movement with the capstan toward and away from the retracted position.

Thus there has been described a capstan, on one side of which a transducing head is mounted in close proximity, and on the other side of which is mounted a pair of differential-pressure tape storage and tensioning columns. The capstan is retractable in an axial direction to clear the transducing head without engaging the differential-pressure columns. The capstan is also arranged to engage the tape by differential pressure or suction means, and the vacuum supply for the capstan is identical with the vacuum supply for the differential-pressure columns. The vacuum channel or conduit supplying the capstan communicates directly with the low-pressure side of the tape loop in the differential-pressure columns. Consequently, if the vacuum fails, or if either of the tape loops grow too long, or if the tape breaks, or if the end of tape arrives, then the vacuum supply to the capstan is automatically cut off, and the capstan, though still turning, ceases to drive the tape.

What is claimed is:

1. In a tape transport including tape-driving means, means causing frictional engagement of said tape and tape driving means, and tape storage and tensioning means, the combination comprising:
differential air pressure means forming a portion of said tape storage and tensioning means for receiving and tensioning a variable loop of said tape;
means for sensing the air pressure at a predetermined point in said differential air pressure means as an indication of the amount of tension and the amount of tape in said loop; and
means interconnecting said sensing means and said means causing frictional engagement for disabling said frictional engagement when said air pressure at said point falls outside a predetermined range.

2. In a tape transport including tape-driving means, means causing frictional engagement of said tape and tape driving means, and tape storage and tensioning means, the combination comprising:
differential air pressure means forming a portion of said tape storage and tensioning means for receiving and tensioning a variable loop of said tape;
means for sensing the air pressure at a predetermined point in said differential air pressure means, said point being one at which said air pressure falls within a first predetermined range when both the amount of tension and the amount of tape in said loop fall within corresponding second and third predetermined ranges; and
means interconnecting said sensing means and said means causing frictional engagement for disabling said frictional engagement when said air pressure at said point falls outside said first predetermined range, indicating that at least one of said amounts falls outside the corresponding predetermined range thereof.

3. In a tape transport including tape-driving means and tape storage and tensioning means, the combination comprising:
differential air pressure means, forming a portion of said tape storage and tensioning means, for receiving and tensioning a variable loop of said tape;
means for sensing the air pressure at a predetermined point on the excursion path of said tape loop in said differential air pressure means, and normally on the low-pressure side of said loop, so that when said loop is of normal length said sensing means senses said low pressure, but when said tape breaks or the end thereof arrives or said loop exceeds said normal length, said sensing mean senses the higher pressure on the high-pressure side of said loop; and
means interconnecting said sensing means and said tape-driving means for disabling said tape-driving means when said air pressure at said point exceeds a predetermined value.

4. In a tape transport including tape-driving means and tape storage and tensioning means, the combination comprising:
first differential air pressure means, forming a portion of said tape storage and tensioning means, for receiving and tensioning a variable loop of said tape;
means for sensing the air pressure at a predetermined point on the excursion path of said tape loop in said first differential air pressure means, and normally on the low-pressure side of said loop, so that when said loop is of normal length said sensing means senses said low pressure, but when said tape breaks or the end thereof arrives or said loop exceeds said normal length, said sensing means senses the higher pressure on the high-pressure side of said loop;
second differential air pressure means, forming a portion of said tape-driving means, for causing operative coupling of said tape and tape-driving means for driving said tape; and
means interconnecting said sensing means and said second differential air pressure means for decoupling said tape and tape-driving means when said air pressure at said point exceeds a predetermined value.

5. In a tape transport including a tape-driving capstan and tape storage and tensioning means, the combination comprising:
differential air pressure means, forming a portion of said tape storage and tensioning means, for receiving and tensioning a variable loop of said tape;
said differential air pressure means being provided with an opening for sensing the air pressure at a predetermined point on the excursion path of said tape loop in said differential air pressure means, and normally on the low-pressure side of said loop, so that when said loop is of normal length said opening senses said low pressure, but when said tape breaks or the end thereof arrives or said loop exceeds said normal length, said opening senses the higher pressure on the high-pressure side of said loop;
said capstan being formed with a hollow interior communicating through appropriate openings with the tape-driving surface of said capstan; and
conduit and manifold means interconnecting said opening and a predetermined sector of said hollow interior of said capstan for causing operative coupling of said tape and capstan throughout said predetermined sector when said opening senses said low-pressure side of said loop, and for causing decoupling of said tape and capstan when said opening senses said high-pressure side of said loop.

6. In a tape transport including a tape-driving capstan and tape storage and tensioning means, the combination comprising:
differential air pressure means including a hollow column of rectangular cross-section, having one open end for receiving and tensioning a variable loop of said tape;
vacuum source means coupled to the other end of said column;
said differential air pressure column being provided with an opening for sensing the air pressure at a predetermined point on the excursion path of said tape loop in said column, and normally on the low-pressure side of said loop, so that when said loop is of normal length said opening senses said low pressure, but when said tape breaks or the end thereof arrives or said loop exceeds said normal length, said opening senses the higher pressure on the high-pressure side of said loop;
said capstan being formed with a hollow interior communicating through appropriate openings with the tape-driving surface of said capstan; and
conduit and manifold means interconnecting said opening and a predetermined sector of said hollow interior of said capstan for causing operative coupling of said tape and capstan throughout said predetermined sector when said opening senses said low-pressure side of said loop, and for causing decoupling of said tape and capstan when said opening senses said high-pressure side of said loop.

7. In a tape transport including a tape-driving capstan and tape storage and tensioning means, the combination comprising:
differential air pressure means including a hollow column of rectangular cross-section, defined in part by a pair of opposed side walls, and having one open end for receiving and tensioning a variable loop of said tape, with the edges of said tape respectively confronting said side walls;

vacuum source means coupled to the other end of said column;

one of said side walls of said differential air pressure column being provided with an opening for sensing the air pressure at a predetermined point on the exursion path of said tape loop in said column, and normally on the low-pressure side of said loop, so that when said loop is of normal length said opening senses said low pressure, but when said tape breaks or the end thereof arrives or said loop exceeds said normal length, said opening senses the higher pressure on the high-pressure side of said loop;

said capstan being formed with a hollow interior communicating through appropriate openings with the tape-driving surface of said capstan; and conduit and manifold means interconnecting said opening and a predetermined sector of said hollow interior of said capstan for causing operative coupling of said tape and capstan throughout said predetermined sector when said opening senses said low-pressure side of said loop, and for causing the coupling of said tape and capstan when said opening senses said high-pressure side of said loop.

8. In a tape transport including a tape-driving capstan and tape storage and tensioning means, the combination comprising:

differential air pressure means including two hollow columns positioned on the path of said tape on either side of said capstan, each of said columns being of rectangular cross-section, each of said columns being defined in part by a pair of opposed side walls, and each of said columns having one open end for receiving and tensioning a variable loop of said tape, with the edges of said tape respectively confronting said side walls thereof;

vacuum source means coupled to the other end of each of said columns;

one of said side walls of each of said differential air pressure columns being provided with an opening for sensing the air pressure at a predetermined point on the excursion path of the respective tape loop therein, and normally on the low-pressure side of said respective loop, so that when said loops are of normal length said openings sense said low pressure, but when said tape breaks or the end thereof arrives or either of said loops exceeds said normal length, the respective opening senses the higher pressure on the high-pressure side of said loop;

said capstan being formed with a hollow interior communicating through appropriate openings with the tape-driving surface of said capstan; and conduit and manifold means interconnecting said openings and a predetermined sector of said hollow interior of said capstan for causing operative coupling of said tape and capstan throughout said predetermined sector when said openings both sense said low-pressure side of said loop, and for causing decoupling of said tape and capstan when at least one of said openings senses said high-pressure side of said loop.

9. In a tape transport including a tape-driving capstan, tape storage and tensioning means, and transducing means mounted in a predetermined plane and positioned to engage said tape in close proximity to one side of said capstan, the combination comprising:

differential air pressure means including a hollow column of rectangular cross-section, having one open end, and mounted in said predetermined plane and on the other side of said capstan for receiving and tensioning a variable loop of said tape;

vacuum source means coupled to the other end of said column;

said differential air pressure column being provided with an opening for sensing the air pressure at a predetermined point on the excursion path of said tape loop in said column, and normally on the low-pressure side of said loop, so that when said loop is of normal length said opening senses said low pressure, but when said tape breaks or the end thereof arrives or said loop exceeds said normal length, said opening senses the higher pressure on the high-pressure side of said loop;

said capstan being formed with a hollow interior communicating through appropriate openings with the tape-driving surface of said capstan;

means mounting said capstan for axial movement toward and away from said predetermined plane;

means for moving said capstan on said mounting means between operating and retracted positions respectively in and away from said predetermined plane and said close proximity to said transducing means; and conduit and manifold means interconnecting said opening and a predetermined sector of said hollow interior of said capstan for causing operative coupling of said tape and capstan throughout said predetermined sector when said capstan is in said operating position thereof and when said opening concurrently senses said low-pressure side of said loop, and for causing decoupling of said tape and capstan when said opening senses said high-pressure side of said loop.

10. In a tape transport including a tape-driving capstan, tape storage and tensioning means, and transducing means mounted in a predetermined plane and positioned to engage said tape in close proximity to one side of said capstan, the combination comprising:

differential air pressure means including a hollow column of rectangular cross-section, having one open end, and mounted in said predetermined plane and on the other side of said capstan for receiving and tensioning a variable loop of said tape;

vacuum source means coupled to the other end of said column;

said differential air pressure column being provided with an opening for sensing the air pressure at a predetermined point on the excursion path of said tape loop in said column, and normally on the low-pressure side of said loop, so that when said loop is of normal length said opening senses said low pressure, but when said tape breaks or the end thereof arrives or said loop exceeds said normal length, said opening senses the higher pressure on the high-pressure side of said loop;

said capstan being formed with a hollow interior communicating through appropriate openings with the tape-driving surface of said capstan;

capstan mounting means including a base plate mounted on said transport and carrying said column and transducing means on one face thereof, said base plate being provided with a circular opening dimensioned for axial extension and withdrawal of said capstan therethrough, a capstan mounting plate having three triangularly spaced raised gauge surfaces lying in a common plane and engaging the opposite face of said base plate in an operating position of said mounting plate, said mounting plate having a cylindrical boss portion extending through and loosely slidably engaging said circular opening of said base plate in said operating position of said mounting plate, three expandable clamping and aligning pins extending respectively from said gauge surfaces and into conforming bores in said base plate for axially centering said boss portion with respect to said circular opening in said operating position of said mounting plate, and for clampingly retaining said gauge surfaces against said base plate, a pair of guide rods extending from said base plate in axial parallelism with said boss portion and circular opening and through conforming sliding journals in said mounting plate, said guide rods being enlarged at the free ends thereof for limiting the movement of said mounting plate, said capstan and drive means therefor being mounted on said mounting plate in axial parallelism with said boss portion with said capstan extending to and lying in said predetermined plane in said operating position of said mounting plate;

screw means mounted on said base plate and engaging a threaded opening in said mounting plate for moving said capstan on said mounting plate between an operating position in said predetermined plane and a retracted position co-planar with said base plate; and a first conduit channel formed in said base plate and communicating with said opening of said differential air pressure column and with the inner peripheral face of said circular opening of said base plate, said boss portion having a second conduit channel formed therein and mating with said first conduit channel in said operating position of said mounting plate, said boss portion also having a manifold portion extending into said hollow interior of said capstan and conforming to the inner surface thereof, said manifold portion having a manifold cavity formed therein and communicating with said second conduit channel and with said openings in said capstan throughout a predetermined tape driving sector of said capstan for causing operative coupling of said tape and capstan throughout said predetermined sector when said capstan is in said operating position thereof and when said column opening concurrently senses said low-pressure side of said loop, and for causing decoupling of said tape and capstan when said opening senses said high-pressure side of said loop.

11. In a tape transport including a tape-driving capstan, tape storage and tensioning means, and transducing means mounted in a predetermined plane and positioned to engage said tape in close proximity to one side of said capstan, the combination as described in claim 15 wherein:

said manifold portion is provided with a partition normal to the axis of said capstan and dividing said manifold cavity into first and second sub-cavities;

said boss portion is provided with a partition dividing said second conduit channel into first and second sub-channels communicating respectively with said first and second sub-cavities;

said base plate is provided with a partition dividing said first conduit channel, adjacent to said circular opening, into first and second sub-channels communicating respectively with said first and second sub-channels of said boss portion; and means are provided for closing one of said sub-channels for adapting said capstan for driving tape of a predetermined narrow width.

12. In a tape transport including a tape-driving capstan and transducing means mounted in a predetermined plane and positioned to engage said tape in close proximity to one side of said capstan, and a pair of differential air pressure columns mounted in said predetermined plane and on the other side of said capstan for receiving and tensioning loops of said tape, the combination comprising:

means mounting said capstan for axial movement toward and away from said predetermined plane; and means for moving said capstan on said mounting means between operating and retracted positions respectively in and away from said predetermined plane and said close proximity to said transducing means.

13. A tape transport including a pneumatic capstan, a pneumatic tape loop chamber, and a source of vacuum coupled to said chamber, characterized in that:

said capstan is pneumatically coupled to said tape loop chamber at a predetermined point that is normally on the low-pressure side of said loop;

whereby said tape is clamped to said capstan so long as said loop is of normal length, and said tape is unclamped from said capstan when said loop extends beyond said predetermined point.

14. A tape transport including a pneumatic capstan, a pneumatic tape loop chamber, and a source of vacuum coupled to said chamber, characterized in that:

said capstan is pneumatically coupled to said tape loop chamber at a predetermined point that is between the normal position of said loop and the point of coupling of said source and chamber;

whereby said tape is clamped to said capstan so long as said loop is in said normal position, and said tape is unclamped from said capstan when said loop extends between said points.

15. A tape transport including a pneumatic capstan, a pneumatic tape loop chamber, and a source of vacuum, comprising:

means for coupling said vacuum source to said chamber at a first predetermined point;

means for coupling said capstan to said chamber at a second predetermined point that is between the normal position of said loop and said first point;

whereby said tape is clamped to said capstan so long as said loop is in said normal position, and said tape is unclamped from said capstan when said loop extends between said points.

References Cited

UNITED STATES PATENTS

| | | | |
|---|---|---|---|
| 2,288,716 | 7/1942 | Kahn | 226—43 |
| 2,988,294 | 6/1961 | Neff | 226—11 |
| 2,996,229 | 8/1961 | Loewe | 226—179 X |
| 3,090,535 | 5/1963 | Hurst et al. | 226—26 |
| 3,112,473 | 11/1963 | Wicklund et al. | 226—118 X |
| 3,122,332 | 2/1964 | Hughes | 226—118 X |
| 3,137,430 | 6/1964 | Aldridge | 226—180 |
| 3,189,239 | 6/1965 | Brumbaugh | 226—118 X |
| 3,195,791 | 7/1965 | Gwillim | 226—97 X |

FOREIGN PATENTS 613,471 11/1948 Great Britain.

M. HENSON WOOD, Jr., *Primary Examiner.*

ALLEN N. KNOWLES, *Examiner.*